United States Patent
Brown

(10) Patent No.: US 9,975,388 B2
(45) Date of Patent: May 22, 2018

(54) SHOCK ABSORBER UPPER MOUNT

(71) Applicant: Mahindra Vehicle Manufactures Limited, Troy, MI (US)

(72) Inventor: Matthew Thomas Brown, South Lyon, MI (US)

(73) Assignee: Mahindra Vehicle Manufacturing Limited, Troy, MI (US)

( * ) Notice: Subject to any disclaimer, the term of this patent is extended or adjusted under 35 U.S.C. 154(b) by 0 days. days.

(21) Appl. No.: 14/940,517

(22) Filed: Nov. 13, 2015

(65) Prior Publication Data

US 2016/0185173 A1 Jun. 30, 2016

Related U.S. Application Data

(60) Provisional application No. 62/078,999, filed on Nov. 13, 2014.

(51) Int. Cl.
*B60G 11/22* (2006.01)
*B60G 13/00* (2006.01)
*B60G 15/06* (2006.01)

(52) U.S. Cl.
CPC ............ *B60G 11/22* (2013.01); *B60G 13/003* (2013.01); *B60G 15/067* (2013.01); *B60G 2202/14* (2013.01); *B60G 2202/312* (2013.01); *B60G 2204/124* (2013.01); *B60G 2204/125* (2013.01); *B60G 2204/128* (2013.01); *B60G 2204/1242* (2013.01); *B60G 2204/41* (2013.01)

(58) Field of Classification Search
CPC .... B60G 11/22; B60G 13/003; B60G 15/067; B60G 2204/125; B60G 2204/128; B60G 2204/41; B60G 2202/14; B60G 2204/1242; B60G 2202/312

USPC ............................ 267/219, 220; 188/321.11
See application file for complete search history.

(56) References Cited

U.S. PATENT DOCUMENTS

| | | | | |
|---|---|---|---|---|
| 4,465,296 A * | 8/1984 | Shiratori | ............. | B60G 15/068 267/220 |
| 6,394,436 B1 * | 5/2002 | Schnaars | ............. | B60G 13/003 267/141.4 |
| 6,588,780 B2 * | 7/2003 | Hayashi | ............... | B60G 13/003 267/220 |
| 6,908,076 B2 * | 6/2005 | Hayashi | ............... | B60G 13/003 267/153 |
| 2003/0102194 A1 * | 6/2003 | Wakita | ................. | B60G 13/003 188/321.11 |
| 2004/0017035 A1 * | 1/2004 | Treder | ...................... | F16F 9/54 267/220 |

(Continued)

FOREIGN PATENT DOCUMENTS

JP          58077945 A  *  5/1983

*Primary Examiner* — Thomas J Williams
(74) *Attorney, Agent, or Firm* — Miller Canfield

(57) ABSTRACT

An upper mount assembly for a shock absorber of an automotive vehicle. The upper mount assembly comprises a top plate and a bottom plate spaced from the top plate. The top and bottom plates are fixedly secured to the vehicle and operatively coupled to the shock absorber. An inner hub is seated between the top and bottom plate. A damper is supported by the inner hub between the top and bottom plate for cooperating with the shock absorber. The damper includes a plurality of spaced apart grooves formed therein for selectively varying the spring rate of the damper to absorb loads from the shock absorber.

10 Claims, 5 Drawing Sheets

(56) References Cited

U.S. PATENT DOCUMENTS

2009/0315292 A1\* 12/2009 Winocur .............. B60G 15/068
 280/124.146

\* cited by examiner

SHOCK ABSORBER UPPER MOUNT

RELATED APPLICATIONS

This application claims priority to and all the benefits of U.S. Provisional Application No. 62/078,999, filed Nov. 13, 2014 and entitled "Shock Absorber Upper Mount".

BACKGROUND OF THE INVENTION

1. Field of the Invention

The invention relates to a shock absorber upper mount assembly for an automotive vehicle, and more particularly, to tunable isolator insert in the upper mount assembly of an automotive vehicle.

2. Description of Related Art

Automotive vehicles include suspension systems between the vehicle body and the axles to prevent damage to the vehicle and improve vehicle ride and comfort by absorbing vibrations transmitted from the road through the wheel and axle to the vehicle.

Suspension systems commonly include a coil spring compressed between the axle and vehicle body for absorbing impact load from the road and a shock absorber coupled between the axle and vehicle body for absorbing loads and suppressing vibrations in the system. The spring and shock absorber are coupled to the axle and vehicle body at opposite ends. The upper end is secured to the vehicle body by an upper mount assembly. The upper mount assembly typically includes a stamped metal bracket fixedly secured to the vehicle body and having a central bore for receiving the shock absorber and a spring seat for receiving the coil spring. A resilient bumper is seated between the central bore and shock absorber for isolating vibrations from the shock absorber from the bracket and vehicle body.

It is desirable, however, to improve the dampening and isolation of loads and vibrations transmitted from the coil spring and shock absorber through the upper mount assembly to the vehicle body and tune the upper mount assembly as desired for optimum performance.

SUMMARY OF THE INVENTION

According to one aspect of the invention, an upper mount assembly is provided for a shock absorber of an automotive vehicle. The upper mount assembly comprises a top plate and a bottom plate spaced from the top plate. The top and bottom plates are fixedly secured to the vehicle and operatively coupled to the shock absorber. An inner hub is seated between the top and bottom plate. A damper is supported by the inner hub between the top and bottom plate for cooperating with the shock absorber. The damper includes a plurality of spaced apart grooves formed therein for selectively varying the spring rate of the damper to absorb loads from the shock absorber.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
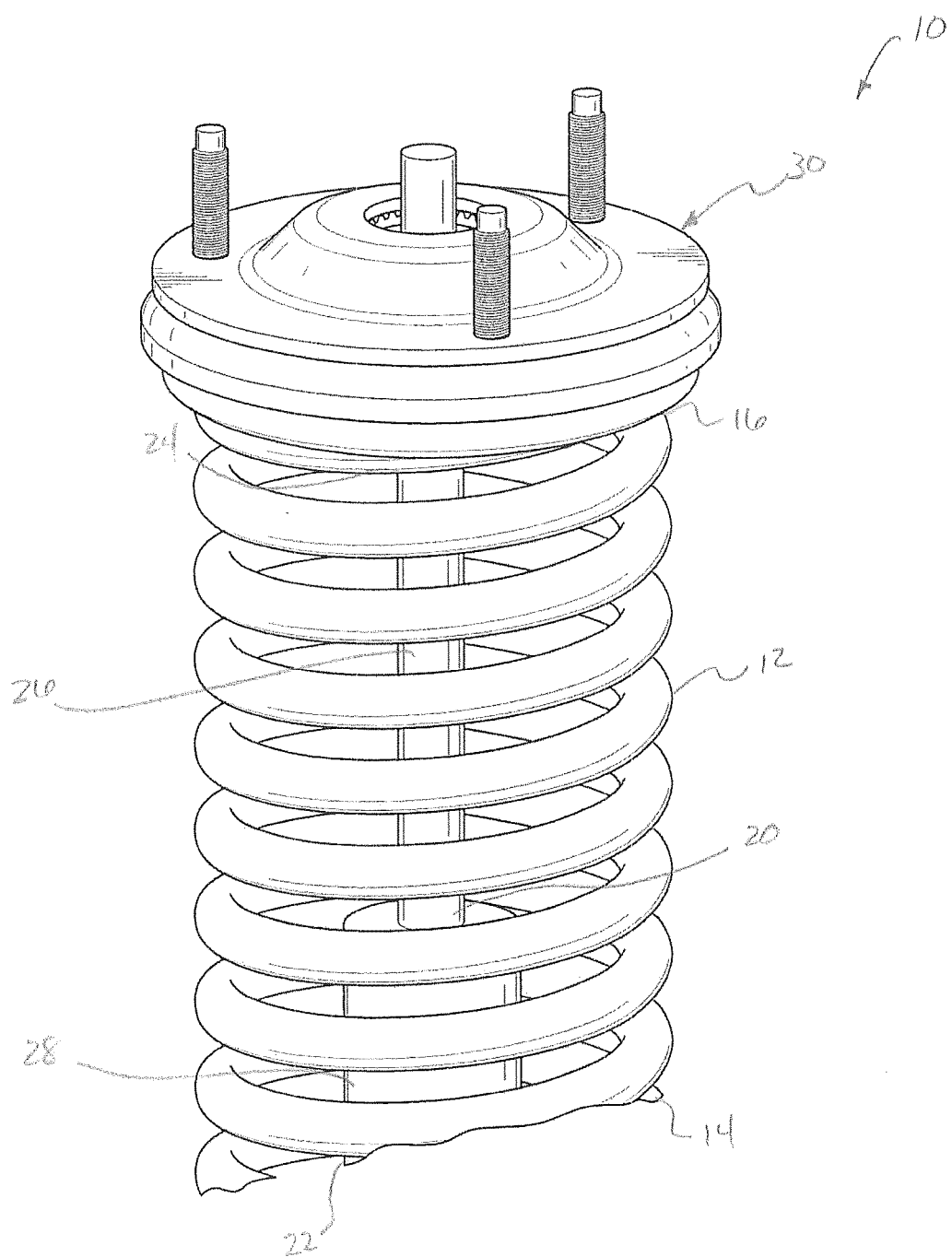
FIG. 1 is fragmentary front perspective view of a suspension system and shock absorber upper mount assembly for an automotive vehicle according to one embodiment of the invention.
Figure 2:
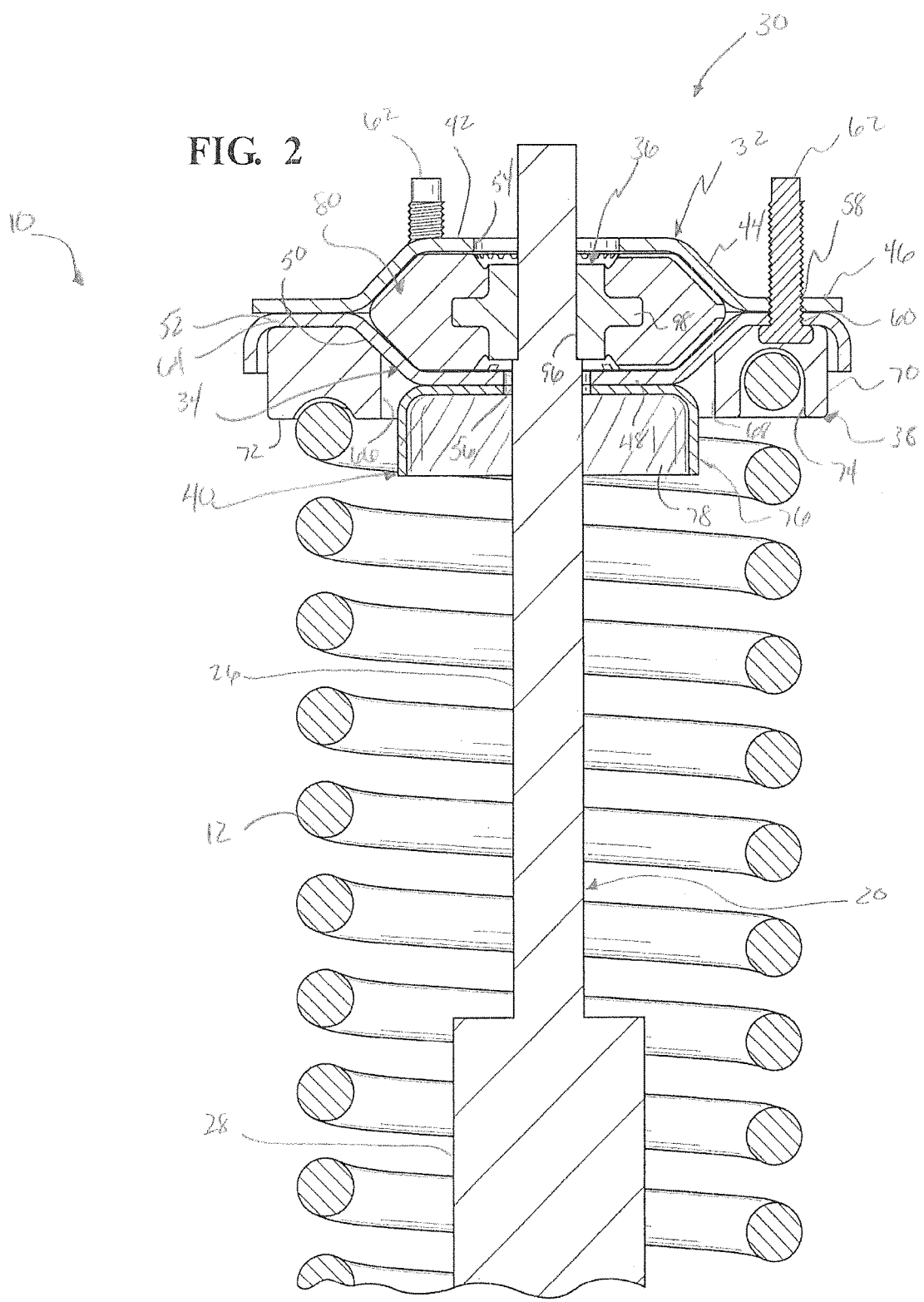
FIG. 2 is a front cross-section view of the suspension system and shock absorber upper mount assembly of FIG. 1.
Figure 3:
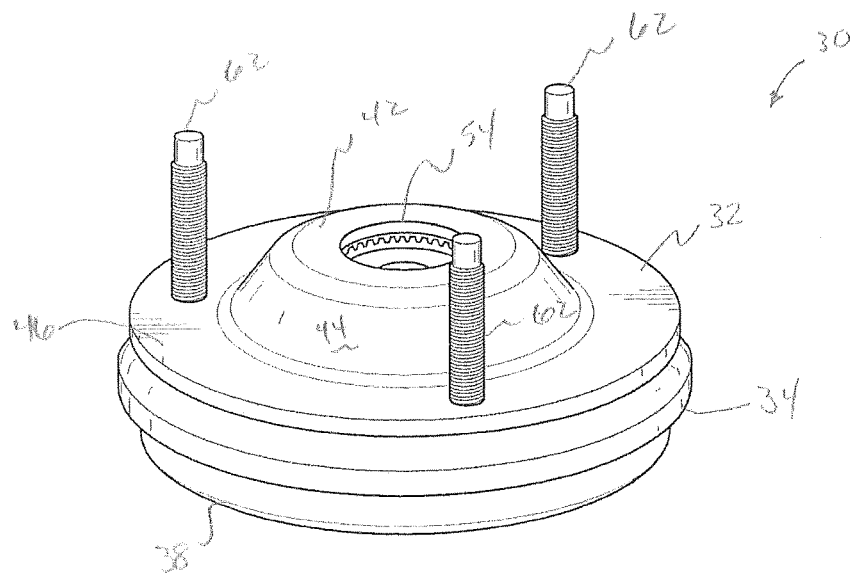
FIG. 3 is a top perspective view of the upper mount assembly.
Figure 4:
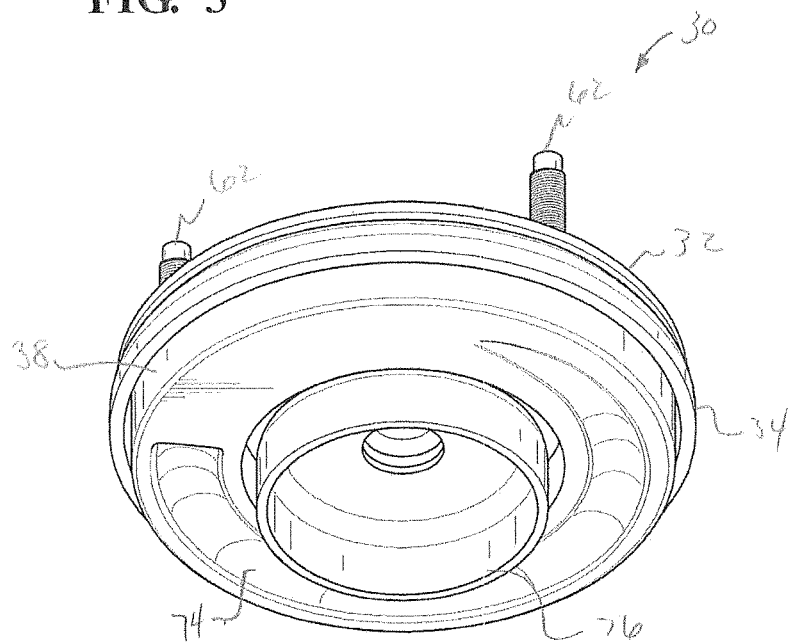
FIG. 4 is a bottom perspective view of the upper mount assembly.

Referring to the Figures, wherein like numerals indicate like or corresponding parts throughout the several views, a suspension system according to one embodiment of the invention for use in an automotive vehicle is generally shown at 10. Referring to FIGS. 1 and 2, the suspension system 10 includes a coil spring 12 extending between a first lower end 14 and an opposite second upper end 16 and a shock absorber 20 extending between a first lower end 22 and an opposite second upper end 24. The shock absorber 20 comprises a rod or piston 26 slidably received in a cylinder 28 as is commonly known in the art and is seated centrally within the coil spring 12. The suspension system 10 further includes an upper mount assembly 30 for mounting the suspension system 10 to the body or frame of the vehicle.

Referring to FIGS. 2-5, the upper mount assembly 30 includes a stamped metal top plate 32, a stamped metal bottom plate 34, an inner metal hub 36, a spring seat 38, a jounce bumper 40, and a damper 80. More specifically, the top plate 32 includes a flat top 42 extending into a tapered side wall 44 and projecting radially to a flat mounting flange 46. Similarly, the bottom plate 34 includes a flat bottom 48 extending into a tapered side wall 50 and projecting radially to a flat mounting flange 52. The bottom plate 34 is a mirror image of the top plate 32 wherein when the mounting flanges 46, 52 are matingly engaged, the flat top 42 is spaced from the flat bottom 48. Each of the top plate 32 and bottom plate 34 includes a central opening 54, 56 for axial receiving the upper end of the rod 26 therethrough. Each of the top plate 32 and bottom plate 34 include a plurality of axially aligned mounting holes 58, 60 extending through and spaced about the perimeter of the mounting flanges 46, 52, respectively, for receiving a threaded mounting stud 62 therethrough for fixedly mounting the suspension system 10 to the body of the vehicle.

The spring seat 38 is comprised of rubber and includes a top wall 64 seated against the mounting flange 52 of the bottom plate 34, and inner wall 66 defining a center opening 68, a peripheral outer wall 70 opposite the inner wall 66 and a bottom wall 72. A helical groove 74 is formed in the bottom wall 72 for receiving and seating the end of the coil spring 12 therein.

The jounce bumper 40 includes a jounce bumper cup 76 mounted to the flat bottom 48 of the bottom plate 34 for receiving a resilient jounce bumper insert 78 therein for absorbing shock impact loads on the shock absorber 20 as is commonly known in the art.

Figure 6:
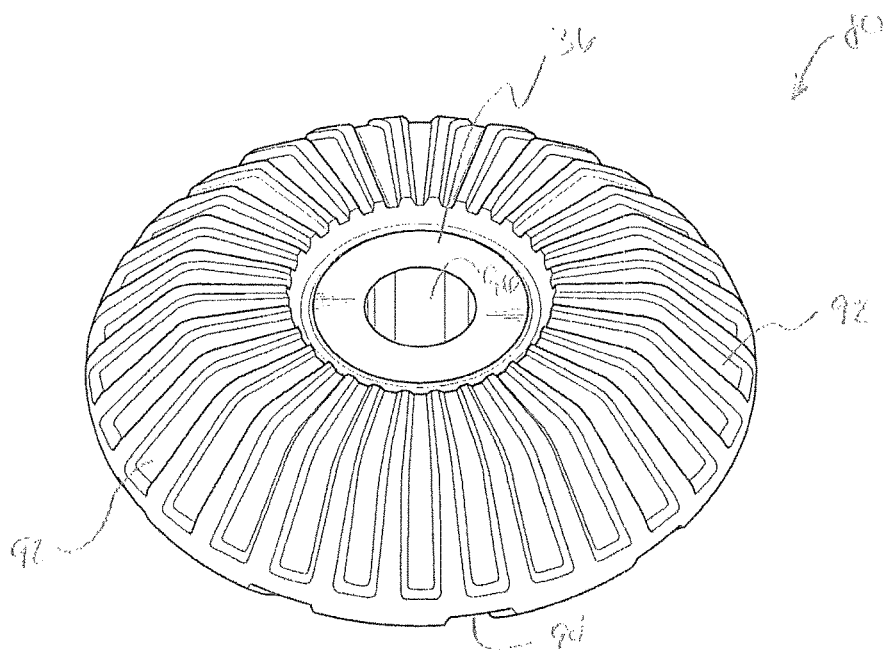
FIG. 6 is top perspective view of the damper of the upper mount assembly.
Figure 7:
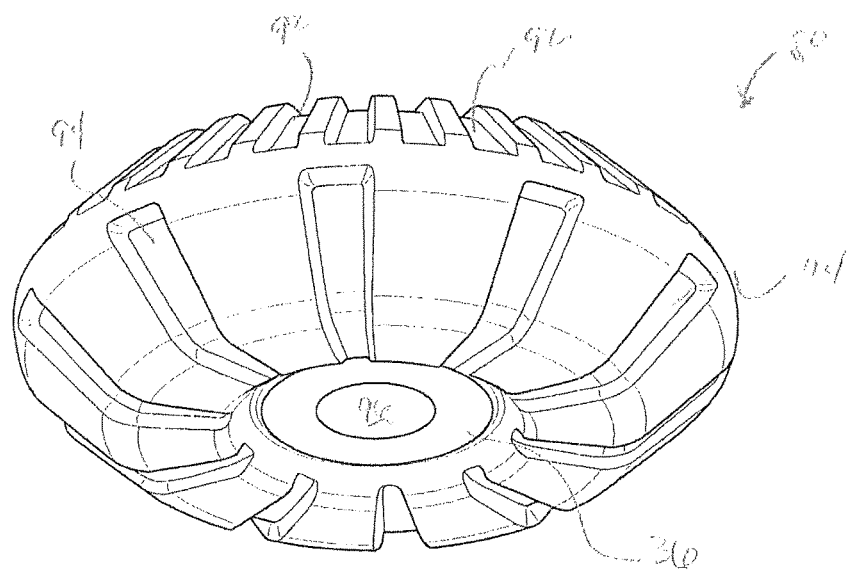
FIG. 7 is a bottom perspective view of the damper of the upper mount assembly.

Finally, the damper 80 is carried by the inner hub 36 and seated between the top plate 32 and bottom plate 34. More specifically, referring to FIGS. 5-7, the damper 80 is comprised of rubber or other suitable resilient material and includes a center cavity 82 for receiving the inner hub 36.

The damper 80 may be press fit or insert molded about the inner hub 36. The damper 80 is disc-shaped or saucer-shaped and includes a top surface 84 seated against the flat top 42 of the top plate 32, an angled top sidewall 86 seated against the side wall 44 of the top plate 32, a bottom surface 88 seated against the flat bottom 48 of the bottom plate 34 and an angled bottom sidewall 90 seated against the side wall 50 of the bottom plate 34. The damper 80 includes a plurality of circumferentially spaced apart top grooves 92 recessed in the top surface 84 and top sidewall 86 and projecting radially outwardly from the center cavity 82 to the outer radial edge of the damper 80. The damper 80 further includes a plurality of circumferentially spaced apart bottom grooves 94 recessed in the bottom surface 88 and bottom sidewall 90 and projecting radially outwardly from the center cavity 82 to the outer radial edge of the damper 80.

Figure 5:
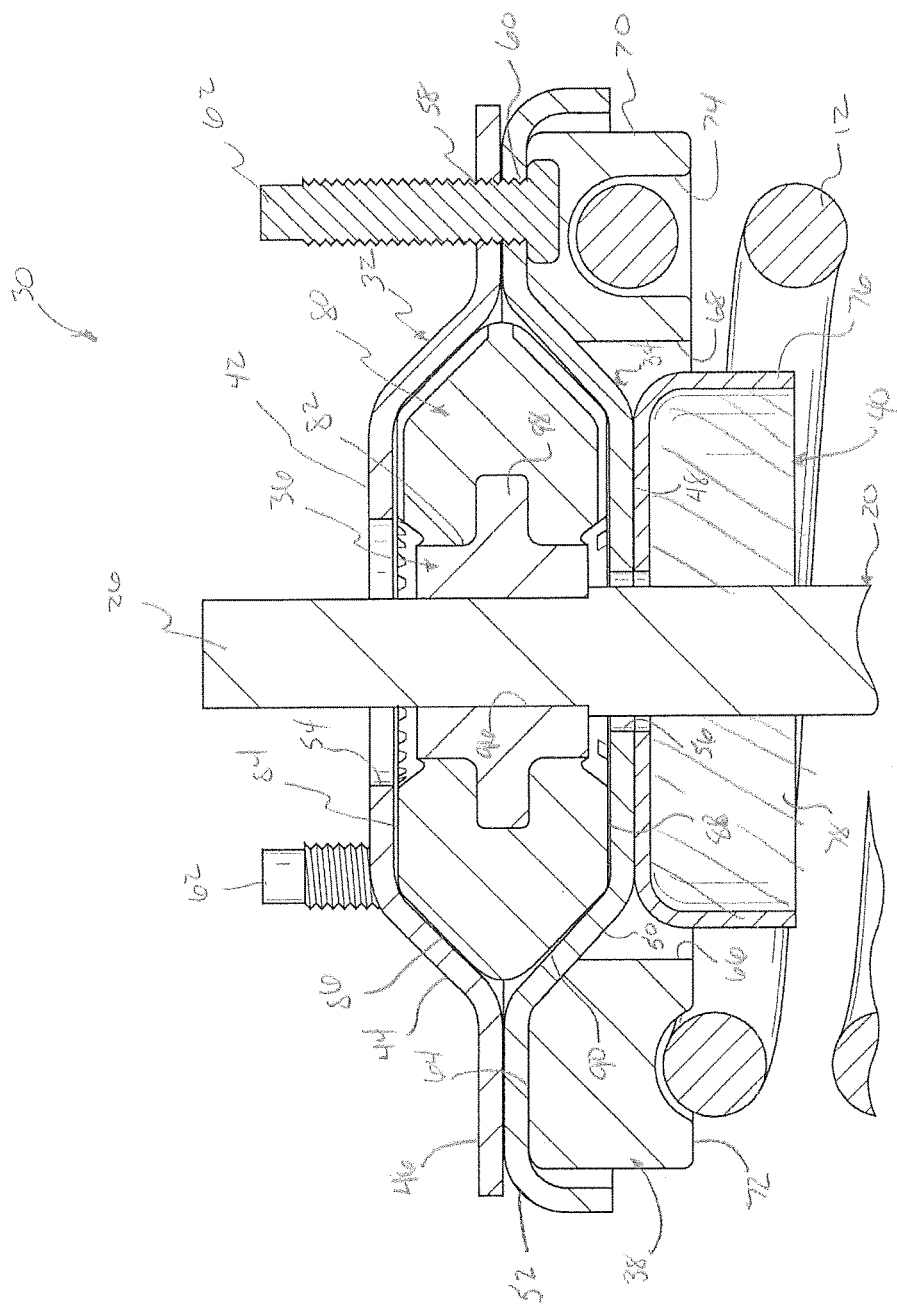
FIG. 5 is an enlarge cross-section view of the upper mount assembly.

The inner hub 36 includes a center bore 96 for receiving the rod 26 of the shock absorber 20 therethrough and an annular flange 98 for interlocking the damper 80 to the inner hub 36, as shown in FIG. 5. The inner hub 36 is also seated between the top plate 32 and bottom plate 34 such that should the damper 80 decay, the inner hub 36 retains the shock absorber 20 coupled to the upper mount assembly 30. The damper 80 absorbs and dampens the vibrations and loads from the shock absorber 20 which are transmitted to the upper mount assembly 30 and thus the body of the vehicle. The top and bottom grooves 92, 94 in the damper 80 allow for selective tuning of the damping of vibrations and loads from the shock absorber. That is, variations in the top and bottom grooves 92, 94 varies the spring rate and thus damping capabilities of the damper 80 in the upper mount assembly 30.

The number and spacing of the top grooves 92 and bottom grooves 94 may vary as desired. Additionally, the grooves 92, 94 in the preferred embodiment are generally rectangular in shape, however, it should be appreciated that the shape, depth, width and number of grooves 92, 94 may vary to change the damping characteristics of the damper 80 and vary the way the loads from the shock absorber 20 are transmitted to the upper mounting assembly 30.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. An upper mount assembly for a shock absorber of an automotive vehicle comprising:
    a top plate and a bottom plate spaced from said top plate, said top and bottom plate adapted to be fixedly secured to the vehicle and operatively coupled to the shock absorber, said top and bottom plates including respective top and bottom plate surfaces disposed in opposing, axial spaced relation;
    an inner hub seated between said top and bottom plate; and
    a damper supported by said inner hub between said top and bottom plate for cooperating with the shock absorber, said damper including a top surface spaced axial opposite a bottom surface, a center cavity extending axial between said top and bottom surface for receiving said inner hub, a top sidewall and a bottom sidewall interconnecting said top and bottom surfaces to form a disc-shaped damper having an outer peripheral radial edge, wherein said top surface and said top sidewall seat against said top plate surface and include a first plurality of radially spaced apart elongated and recessed grooves recessed in said top surface and said top sidewall and extending radially outwardly from said center cavity to said outer peripheral radial edge for selectively varying the spring rate of said damper to absorb loads from the shock absorber.

2. The upper mount assembly as set forth in claim 1 wherein said bottom surface and said bottom sidewall seat against said bottom plate surface and include a second plurality of radially spaced apart elongated and recessed grooves recessed in said bottom surface and said bottom sidewall and extending radially outwardly from said center cavity to said outer radial edge of said damper for selectively varying the spring rate of said damper to absorb loads from the shock absorber.

3. The upper mount assembly as set forth in claim 2 wherein said top plate includes a flat top having a central opening for receiving the shock absorber therethrough, a side wall, and a mounting flange.

4. The upper mount assembly as set forth in claim 3 wherein said bottom plate includes a flat bottom spaced from said flat top and having a central opening for receiving the shock absorber therethrough, a side wall, and a mounting flange.

5. The upper mount assembly as set forth in claim 4 wherein said mounting flange of said top plate is fixedly secured to said mounting flange of said bottom plate.

6. The upper mount assembly as set forth in claim 5 wherein a spring seat is secured to the bottom plate for receiving and supporting a coil spring.

7. The upper mount assembly as set forth in claim 6 wherein a jounce bumper cup is secured to said flat bottom of said bottom plate for receiving and supporting a jounce bumper to prevent impact loads from the shock absorber.

8. The upper mount assembly as set forth in claim 7 further including a plurality of fasteners extending between said mounting flange of said top plate and said mounting flange of said bottom plate for mounting said upper mount assembly to the vehicle.

9. The upper mount assembly as set forth in claim 2 wherein an axial damper thickness of said damper is defined between said top and bottom surface thereof, and said axial damper thickness is proximate an axial distance defined between said top and bottom plate surfaces.

10. The upper mount assembly as set forth in claim 1 wherein an axial damper thickness of said damper is defined between said top and bottom surface thereof, and said axial damper thickness is proximate an axial distance defined between said top and bottom plate surfaces.

* * * * *